(12) United States Patent
Kitayama et al.

(10) Patent No.: US 9,818,348 B2
(45) Date of Patent: Nov. 14, 2017

(54) LIQUID CRYSTAL DISPLAY DEVICE

(75) Inventors: Masae Kitayama, Osaka (JP);
Mitsuaki Hirata, Osaka (JP);
Fumikazu Shimoshikiryoh, Osaka (JP); Kenichi Hyodo, Osaka (JP);
Ikumi Itsumi, Osaka (JP); Yuki Yamashita, Osaka (JP); Akane Sugisaka, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 947 days.

(21) Appl. No.: 13/575,691

(22) PCT Filed: Jan. 27, 2011

(86) PCT No.: PCT/JP2011/051586
§ 371 (c)(1),
(2), (4) Date: Aug. 29, 2012

(87) PCT Pub. No.: WO2011/093374
PCT Pub. Date: Aug. 4, 2011

(65) Prior Publication Data
US 2012/0320026 A1  Dec. 20, 2012

(30) Foreign Application Priority Data

Jan. 29, 2010 (JP) .................. 2010-019258

(51) Int. Cl.
*G09G 3/36* (2006.01)
*G02F 1/1337* (2006.01)
*G02F 1/1362* (2006.01)

(52) U.S. Cl.
CPC .......... *G09G 3/36* (2013.01); *G02F 1/13624* (2013.01); *G02F 1/133707* (2013.01);
(Continued)

(58) Field of Classification Search
USPC .................. 345/87–104, 204, 690
See application file for complete search history.

(56) References Cited

U.S. PATENT DOCUMENTS 6,552,706 B1 * 4/2003 Ikeda et al. ............... 345/96
6,952,252 B2 10/2005 Nakanishi
(Continued)

FOREIGN PATENT DOCUMENTS

CN 101424821 A 5/2009
JP 2001-033757 A 2/2001
(Continued)

OTHER PUBLICATIONS

English translation of Official Communication issued in corresponding International Application PCT/JP2011/051586, dated on Sep. 27, 2012.
(Continued)

*Primary Examiner* — Benjamin C Lee
*Assistant Examiner* — Jeffrey S Steinberg
(74) *Attorney, Agent, or Firm* — Keating & Bennett, LLP

(57) ABSTRACT

A color display pixel $P_{CD}$ in a liquid crystal display device (100) includes first through fourth pixels $P_1$ through $P_4$ arrayed in two rows by two columns, and first and second signal lines (13a, 13b) which are located in correspondence with each column of pixels and are supplied with signal voltages of polarities opposite to each other from a signal line driving circuit (30) in each vertical scanning period. A TFT (14) of one of the first and third pixel $P_1$ and $P_3$ is connected to the first signal line (13a), and a TFT (14) of the other pixel is connected to the second signal line (13b). A TFT (14) of one of the second and fourth pixel $P_2$ and $P_4$ is connected to the first signal line (13a), and a TFT (14) of the other pixel is connected to the second signal line (13b). The TFTs (14) of the first through fourth pixels $P_1$ through $P_4$ are (Continued)

controlled to be ON/OFF by a common scanning signal, and the polarities of the signal voltages supplied to the first and second signal lines (13a, 13b) are constant during an arbitrary vertical scanning period. Owing to this, the load on the signal line driving circuit is reduced.

8 Claims, 6 Drawing Sheets

(52) U.S. Cl.
CPC . *G02F 2201/52* (2013.01); *G09G 2300/0452* (2013.01); *G09G 2310/0205* (2013.01); *G09G 2320/0247* (2013.01); *G09G 2330/045* (2013.01)

(56) References Cited

U.S. PATENT DOCUMENTS

| | | | |
|---|---|---|---|
| 6,958,791 | B2 | 10/2005 | Shimoshikiryo |
| 6,977,704 | B2 | 12/2005 | Kataoka |
| 7,920,114 | B2 * | 4/2011 | Shiomi ............ 345/88 |
| 2001/0026331 | A1 * | 10/2001 | Oota et al. ............ 349/43 |
| 2003/0090450 | A1 * | 5/2003 | Inada et al. ............ 345/87 |
| 2003/0146893 | A1 | 8/2003 | Sawabe |
| 2006/0055858 | A1 | 3/2006 | Nakanishi et al. |
| 2006/0215066 | A1 | 9/2006 | Ueda et al. |
| 2008/0074601 | A1 | 3/2008 | Lee et al. |
| 2009/0189881 | A1 * | 7/2009 | Ooishi et al. ............ 345/211 |
| 2009/0225103 | A1 | 9/2009 | Shiomi |
| 2009/0303219 | A1 * | 12/2009 | Kimura et al. ............ 345/211 |
| 2010/0020257 | A1 * | 1/2010 | Jun et al. ............ 349/44 |
| 2010/0253668 | A1 | 10/2010 | Sugihara et al. |

FOREIGN PATENT DOCUMENTS

| | | |
|---|---|---|
| JP | 2002-357830 A | 12/2002 |
| JP | 2003-177418 A | 6/2003 |
| JP | 2004-062146 A | 2/2004 |
| JP | 2006-078968 A | 3/2006 |
| JP | 2006-133577 A | 5/2006 |
| JP | 2008-076416 A | 4/2008 |
| JP | 2009-175468 A | 8/2009 |
| WO | 2009/084331 A1 | 7/2009 |

OTHER PUBLICATIONS

Official Communication issued in International Patent Application No. PCT/JP2011/051586, dated on Apr. 26, 2011.

Hanaoka et al., "40.1: A New MVA-LCD by Polymer Sustained Alignment Technology," SID 04 Digest, 2004, pp. 1200-1203.

* cited by examiner (a)

(b)

LIQUID CRYSTAL DISPLAY DEVICE

TECHNICAL FIELD

The present invention relates to a liquid crystal display device, and specifically to a liquid crystal display device for providing color display by four or more types of pixels for displaying different colors from each other.

BACKGROUND ART

Today, liquid crystal display devices are used in various applications. Each of pixels in a liquid crystal display device exhibits a luminance in accordance with the level of voltage applied to a liquid crystal layer. As an electrical representation, the pixel is represented as a liquid crystal capacitance formed by pixel electrode/liquid crystal layer/counter electrode. The level of voltage applied to the pixel (liquid crystal layer) is represented based on the potential of the counter electrode. A liquid crystal material is a dielectric material, and is deteriorated when being supplied with a DC voltage for a long period of time. In order to prevent this, the polarity (direction) of the voltage (electric field) applied to the liquid crystal layer is inverted at intervals of a certain time period (referred to as the "AC driving"). Frame inversion driving (or field inversion driving), by which the polarity of the voltage (direction of the electric field) applied to each pixel is inverted at intervals of a vertical scanning period is adopted.

However, in mass-produced liquid crystal display devices, it is difficult to accurately match the absolute values of the voltage before and after the polarity inversion of voltage. Each time the polarity is inverted, the absolute value of the voltage is slightly changed. As a result, while a still image is displayed, each time the polarity is inverted, the luminance is changed and thus the display flickers. According to a method for reducing the flicker, pixels supplied with voltages of opposite polarities are located to be adjacent to each other in a display area, so that the luminances of the pixels are spatially averaged. By use of this effect, the flicker is reduced. A representative technique of such a method is "one-dot inversion driving", by which the polarities of the voltages applied to the adjacent pixels are made opposite to each other. The term "dot" means the pixel.

In a conventionally common liquid crystal display device, one color display includes three pixels for displaying red, green and blue, which are the three primary colors of light. The luminance of each pixel is controlled to provide color display. The color display pixel and the pixel may occasionally be referred to as the "pixel" and "sub pixel", respectively (see, for example, Patent Document 1). When one-dot inversion driving is performed in a liquid crystal display device in which one color display pixel includes R, G and B pixels arrayed in a row direction, the polarities of the pixels in one row become R(+), G(−), B(+), R(−), G(+), B(−). Namely, when the polarities of the voltages applied to pixels adjacent to each other are made inverted to each other, the polarities of the voltages applied to pixels of a same color which are adjacent to each other are also made inverted to each other.

Recently, in order to enlarge the range of colors which can be displayed by a liquid crystal display device (referred to as the "color reproduction range"), techniques of using an increased number of primary colors for display have been proposed. For example, Patent Document 1 discloses a liquid crystal display device in which a color display pixel includes a red (R) pixel, a green (G) pixel, a blue (B) pixel, and a pixel of at least one more color (yellow (Y) pixel, a cyan (C) pixel, a magenta (M) pixel or a white (W) pixel). When the white pixel is used, the color reproduction range cannot be enlarged but the display luminance can be increased.

As shown in FIG. 8(a) of Patent Document 1, when one-dot inversion driving is performed in a liquid crystal display device in which two color pixels are alternately arrayed in the row direction, the polarities of the pixels in one row become, for example, R(+), Y(−), R(+), Y(−). Namely, pixels of the same color are supplied with voltages of the same polarity. When display is provided with pixels of a particular color (e.g., when red is displayed in the entire screen), flicker occurs.

Patent Document 1 describes that flicker can be prevented by the following. A color display pixel includes four or more pixels, which include N pixels (N is an integer of 2 or greater) at least in a vertical scanning direction (column direction). Two-dot inversion driving (by which the polarity is inverted every second column of pixels) is performed in a horizontal scanning direction (row direction), and N horizontal line inversion driving (by which the polarity is inverted every N'th row of pixels) is performed in the vertical scanning direction.

Patent Document 2 also discloses a liquid crystal display device in which a color display pixel includes pixels arrayed in two rows by row columns, although this is not for the purpose of enlarging the color reproduction range (in Patent Document 2, the color display pixel is referred to as the "picture element"). As examples of combination of four pixels included in the color display pixel, Patent Document 2 shows a combination of one blue pixel, one red pixel and two green pixels, and a combination of one blue pixel, one red pixel, one green pixel and one white pixel. The liquid crystal display device disclosed in Patent Document 2 includes one scanning line common to the four pixels included in the color display pixel and four signal lines (two signal lines are provided in each of two positions sandwiching two pixels arrayed in the column direction). The polarities of the voltages supplied to adjacent signal lines are opposite to each other. Signal lines connected to pixels located at corresponding positions in color display pixels adjacent to each other in the row direction have different positional relationships from each other with respect to the corresponding pixels. As a result, the polarities of the signal voltages supplied to pixels of a same color which are adjacent to each other in the row direction are opposite to each other. Therefore, flicker can be prevented.

CITATION LIST

Patent Literature

Patent Document 1: Japanese Laid-Open Patent Publication No. 2008-76416
Patent Document 2: Japanese Laid-Open Patent Publication No. 2001-33757

SUMMARY OF INVENTION

Technical Problem

Currently, liquid crystal display devices operable by double speed or quadruple speed driving and thus having improved moving image display characteristics have been put into practical use. More specifically, liquid crystal display devices in which the vertical scanning period is 1/120 sec. or 1/240 sec. have been developed, as opposed to a conventional liquid crystal display device in which the vertical scanning period is 1/60 sec. (vertical scanning frequency is 60 Hz). These newly developed liquid crystal display devices are for HDTV, and the display screen thereof has been progressively enlarged.

The "vertical scanning period" means a time period from when a scanning line (gate bus line) is selected until the same scanning line is selected the next time. In a conventional liquid crystal display device in which double speed driving is not performed, when the video signal is a signal for non-interlace driving, 1 vertical scanning period corresponds to 1 frame period of the video signal, whereas when the video signal is a signal for interlace driving, 1 vertical scanning period corresponds to 1 field of the video signal. For example, in the case of an NTSC signal, 1 vertical scanning period in a liquid crystal display device is 16.7 msec, which is the inverse of the field frequency of the NTSC signal (60 Hz). Since interlace driving is not performed in a liquid crystal display device, a signal voltage is written to all the pixels in both of an odd numbered field and an even numbered field. Therefore, the inverse of the field frequency of the NTSC signal is the vertical scanning period.

When dot inversion driving is performed in a liquid crystal display device including a great number of pixels, which is operable at 120 Hz or 240 Hz, for example, a liquid crystal display device for HDTV, the load on the signal line driving circuit (source driver) for supplying a signal voltage to the signal lines is increased. Namely, the power consumption by the signal line driving circuit is increased, and thus the caloric value is increased.

When the technology described in Patent Document 1 or 2 is adopted, flicker can be prevented in a liquid crystal display device in which the color display pixel includes four pixels arrayed in two rows by two columns as described above, but the load on the signal line driving circuit is large. In addition, when the vertical scanning frequency (also referred to simply as the "driving frequency") is high, flicker is difficult to be visually recognized. From the point of view of industrial production, it is important that the load on the signal line driving circuit should be reduced.

The present invention made in light of the above-described problems has a main object of reducing the load on the signal line driving circuit in a liquid crystal display device in which a color display pixel includes four pixels arrayed in two rows by two columns.

Solution to Problem

A liquid crystal display device according to the present invention includes a plurality of pixels arrayed in a matrix of a plurality of rows by a plurality of columns. The liquid crystal display device includes an active matrix substrate including a pixel electrode provided for each of the plurality of pixels, a switching element connected to the pixel electrode, a plurality of scanning lines extending in a row direction, and a plurality of signal lines extending in a column direction; a counter substrate facing the active matrix substrate; a liquid crystal layer provided between the active matrix substrate and the counter substrate; a scanning line driving circuit for supplying a scanning signal to each of the plurality of scanning lines; and a signal line driving circuit for supplying a positive or negative signal voltage to each of the plurality of signal lines. The plurality of pixels form a plurality of color display pixels, and the plurality of color display pixels each include first, second, third and fourth pixels arrayed in two rows by two columns; wherein the first pixel and the second pixel are adjacent to each other in the row direction, the third pixel and the fourth pixel are adjacent to each other in the row direction, the first pixel and the third pixel are adjacent to each other in the column direction, and the second pixel and the fourth pixel are adjacent to each other in the column direction. The plurality of signal lines include first and second signal lines which are located in correspondence with each column of pixels and are supplied with signal voltages of opposite polarities from each other from the signal line driving circuit in each vertical scanning period. In an arbitrary color display pixel, the switching element of one of the first and third pixels is connected to the first signal line, the switching element of the other of the first and third pixels is connected to the second signal line, the switching element of one of the second and fourth pixels is connected to the first signal line, the switching element of the other of the second and fourth pixels is connected to the second signal line, and the switching elements of the first, second, third and fourth pixels are controlled to be ON/OFF by a common scanning signal. During an arbitrary vertical scanning period, the polarities of the signal voltages supplied to the first and second signal lines are constant. The polarities of the signal voltages supplied to the first and second signal lines are inverted at intervals of a vertical scanning period or at intervals of two or more vertical scanning periods. The color display pixel may include pixels in 2 rows by an even number of columns.

In an embodiment, in a color display pixel adjacent to the arbitrary color display pixel in the column direction, the switching element of one of the first and third pixels is connected to the second signal line, the switching element of the other of the first and third pixels is connected to the first signal line, the switching element of one of the second and fourth pixels is connected to the second signal line, and the switching element of the other of the second and fourth pixels is connected to the first signal line.

In an embodiment, in an arbitrary vertical scanning period, a polarity of the signal voltage supplied to each of the first, second, third and fourth pixels included in an arbitrary color display pixel, and a polarity of the signal voltage supplied to each of the first, second, third and fourth pixels included in a color display pixel adjacent to the arbitrary color display pixel in the row direction, are opposite to each other.

In an embodiment, in an arbitrary vertical scanning period, the polarities of the voltage signals supplied to the first pixel and the second pixel included in an arbitrary first color display pixel are opposite to each other, and the polarities of the voltage signals supplied to the third pixel and the fourth pixel included in the arbitrary first color display pixel are opposite to each other.

In an embodiment, in an arbitrary vertical scanning period, the polarities of the signal voltages supplied to two arbitrary signal lines adjacent to each other, among the plurality of signals, are opposite to each other.

In an embodiment, in an arbitrary color display pixel, the switching elements of the first, second, third and fourth pixels are connected to a common scanning line.

In an embodiment, the first, second, third and fourth pixels include one of a yellow pixel, a cyan pixel, a magenta pixel and a white pixel in addition to a red pixel, a blue pixel and a green pixel.

In an embodiment, for displaying an intermediate gray scale level, the plurality of pixels each include a bright sub pixel exhibiting a luminance higher than that of the gray scale level to be displayed and a dark sub pixel exhibiting a luminance lower than that of the gray scale level to be displayed.

In an embodiment, the vertical scanning period is 1/120 seconds or shorter.

A liquid crystal display device in an embodiment is of a VA mode, for example, of a PSA mode.

Advantageous Effects of Invention

According to the present invention, in a liquid crystal display device in which a color display pixel includes four pixels arrayed in two rows by two columns, the load on the signal line driving circuit can be reduced.

DESCRIPTION OF EMBODIMENTS

Hereinafter, liquid crystal display devices in embodiments according to the present invention will be described with reference to the drawings. The present invention is not limited to the following embodiments provided as examples.

Figure 1:
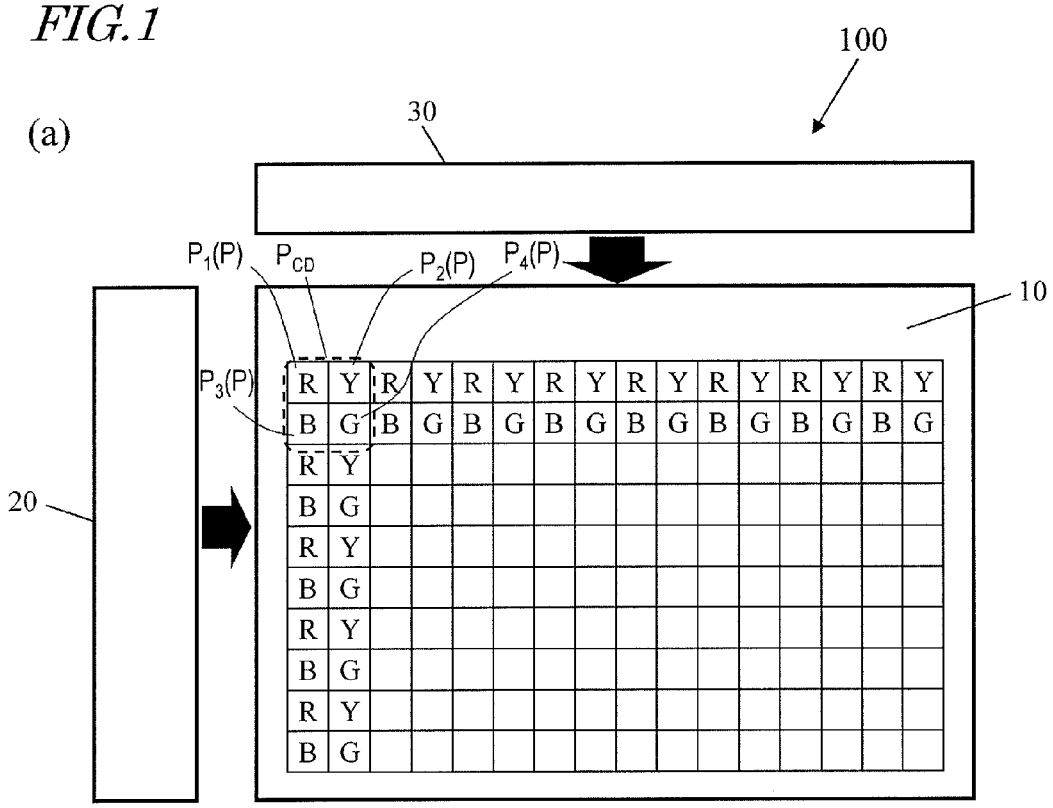
FIG. 1(a) is a schematic plan view of a liquid crystal display device 100 in an embodiment according to the present invention.
FIG. 1(b) is a schematic view showing electrical connections regarding pixels in a liquid crystal display panel 10.
Figure 1:
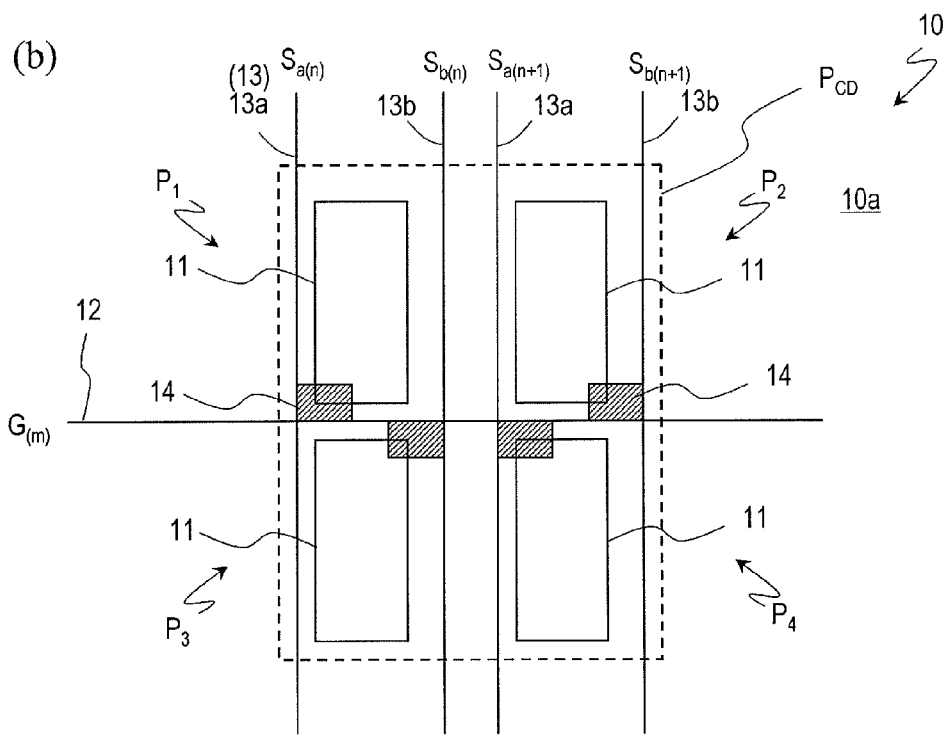

With reference to FIGS. 1(a) and (b), a structure of a liquid crystal display device 100 in an embodiment according to the present invention will be described. FIG. 1(a) is a schematic plan view of the liquid crystal display device 100, and FIG. 1(b) is a schematic view showing electrical connections regarding pixels in a liquid crystal display panel 10.

As shown in FIG. 1(a), the liquid crystal display device 100 includes the liquid crystal display panel 10 including a plurality of pixels P arrayed in a matrix of a plurality of rows by a plurality of columns, and a scanning line driving circuit (gate driver) 20 and a signal line driving circuit (source driver) 30 both for supplying driving signals to the liquid crystal display panel 10.

The plurality of pixels P in the liquid crystal display panel 10 form a plurality of color display pixels $P_{CD}$, and each of the color display pixels $P_{CD}$ includes four pixels P. The four pixels P are a first pixel $P_1$, a second pixel $P_2$, a third pixel $P_3$ and a fourth pixel $P_4$ which are arrayed in two rows by two columns. The first pixel $P_1$ and the second pixel $P_2$ are adjacent to each other in a row direction, and the third pixel $P_3$ and the fourth pixel $P_4$ are adjacent to each other in the row direction. The first pixel $P_1$ and the third pixel $P_3$ are adjacent to each other in a column direction, and the second pixel $P_2$ and the fourth pixel $P_4$ are adjacent to each other in the column direction.

In this example, the first pixel $P_1$ is a red (R) pixel, the second pixel $P_2$ is a yellow (R) pixel, the third pixel $P_3$ is a blue (B) pixel, and the fourth pixel $P_4$ is a green (G) pixel. FIG. 1(a) shows one row and one column of the color display pixels and omits the other color display pixels. The same color display pixels as those shown in the figure are arrayed in a matrix. The colors of the four pixels $P_1$ through $P_4$ included in the color display pixel are not limited to the above. From the point of view of color reproducibility, it is preferable that at least R, G and B pixels are included. Preferably, the other color is yellow (Y), cyan (C) or magenta (M), but may be white (W).

It is not necessary that the four pixels $P_1$ through $P_4$ all have the same size. From the point of view of color reproducibility, it is preferable that the red pixel and the blue pixel are larger than the pixels of the other two colors. In order to provide the scanning lines and the signal lines linearly, it is preferable that each pixel is generally rectangular, that the first pixel $P_1$ and the second pixel $P_2$ arrayed in the row direction have an equal length in the column direction, that the third pixel $P_3$ and the fourth second pixel $P_4$ arrayed in the row direction have an equal length in the column direction, that the first pixel $P_1$ and the third pixel $P_3$ arrayed in the column direction have an equal length (width) in the row direction, and that the second pixel $P_2$ and the fourth pixel $P_4$ arrayed in the column direction have an equal length (width) in the row direction. Preferably, the color display pixel $P_{CD}$ is generally square.

Now, with reference to FIG. 1(b), electrical connections regarding a pixel in the liquid crystal display panel 10 will be described. FIG. 1(b) is a plan view of an active matrix substrate (TFT substrate) 10a included in the liquid crystal display panel 10, but omits a liquid crystal layer and a counter substrate located to face the active matrix substrate 10a with the liquid crystal layer being held therebetween. The counter substrate typically includes a counter electrode, a color filter layer, a light blocking layer (black matrix), and the like. The color filter layer may be provided in the active matrix substrate. As is well known, in a liquid crystal display device of an IPS mode or an FFS mode, the counter electrode may be provided in the active matrix substrate.

FIG. 1(b) shows an area of the active matrix substrate 10a which corresponds to four pixels included in one color display pixel $P_{CD}$.

As shown in FIG. 1(b), the active matrix substrate 10a includes a pixel electrode 11 provided for each of the pixels P, a switching element (in this example, TFT) 14 connected to the pixel electrode 11, a plurality of scanning lines (gate bus lines) 12 extending in the row direction, and a plurality of signal lines (source bus lines) 13 extending in the column direction. The scanning line driving circuit 20 shown in FIG. 1(a) supplies a scanning signal to each of the plurality of scanning lines 12, and the signal line driving circuit 30 shown in FIG. 1(a) supplies a positive or negative signal voltage to each of the plurality of signal lines 13. Herein, a TFT type liquid crystal display device including the TFT 14 as a switching element will be described, but the switching element may be anything which operates in substantially the same manner as the TFT 14.

The plurality of signal lines 13 include a first signal line 13a and a second signal line 13b which are provided in correspondence with each column of pixels. The first signal line 13a and the second signal line 13b are supplied with signal voltages of opposite polarities from each other from the signal line driving circuit 30 in each vertical scanning period. For example, while the first signal line 13a is supplied with a positive signal voltage, the second signal line 13b is supplied with a negative signal voltage. Herein, among the two signal lines 13a and 13b located in correspondence with each column of pixels, the left signal line is referred to as the "first signal line 13a" and the right signal line is referred to as the "second signal line 13b". The polarities of the signal voltages supplied to the first signal line 13a and the second signal line 13b are independent in each column of pixels. Specifically, referring to FIG. 1(b), the polarity of the signal voltage supplied to a first signal line $S_{a(n)}$ located in correspondence with an n'th column of pixels, and the polarity of the signal voltage supplied to a first signal line $S_{a(n+1)}$ located in correspondence with the (n+1)th column of pixels, are independent from each other. Similarly, the polarity of the signal voltage supplied to a second signal line $S_{b(n)}$ located in correspondence with the n'th column of pixels, and the polarity of the signal voltage supplied to a second signal line $S_{b(n+1)}$ located in correspondence with the (n+1)th column of pixels, are independent from each other. In the above, the polarity of the signal voltage supplied to the first signal line $S_{a(n)}$ and the polarity of the signal voltage supplied to the second signal line $S_{b(n)}$ are opposite to each other. The polarity of the signal voltage supplied to the first signal line $S_{a(n+1)}$ and the polarity of the signal voltage supplied to the second signal line $S_{b(n+1)}$ are opposite to each other.

In an arbitrary color display pixel $P_{CD}$, the TFT 14 of one of the first pixel $P_1$ and the third pixel $P_3$ is connected to the first signal line 13a, and the TFT 14 of the other of the first pixel $P_1$ and the third pixel $P_3$ is connected to the second signal line 13b. The TFT 14 of one of the second pixel $P_2$ and the fourth pixel $P_4$ is connected to the first signal line 13a, and the TFT 14 of the other of the second pixel $P_2$ and the fourth pixel $P_4$ is connected to the second signal line 13b. In this example, the TFT 14 of the first pixel $P_1$ is connected to the first signal line 13a, and the TFT 14 of the third pixel $P_3$ is connected to the second signal line 13b. The TFT 14 of the third pixel $P_3$ is connected to the second signal line 13b, and the TFT 14 of the fourth pixel $P_4$ is connected to the first signal line 13a. The TFTs may each be connected to the opposite signal line.

The TFTs 14 of the four pixels $P_1$ through $P_4$ are all controlled to be ON/OFF by a common scanning signal. In this example, the TFTs 14 of the four pixels $P_1$ through $P_4$ are all connected to a common scanning line 12. Alternatively, as long as the TFTs 14 are controlled to be ON/OFF by a common scanning signal, the scanning signal may be supplied from different scanning lines. For example, as described later, in the case where one pixel electrode includes two sub pixel electrodes, specifically, a bright sub pixel exhibiting a luminance higher than that of the gray scale level to be displayed and a dark sub pixel exhibiting a luminance lower than that of the gray scale level to be displayed, two scanning lines are provided in correspondence with the two sub pixel electrodes and a common scanning signal is supplied to the scanning lines.

With such a structure, the four pixels $P_1$ through $P_4$ included in one color display pixel $P_{CD}$ are driven by one scanning line $G_{(m)}$, and four signal lines $S_{a(n)}$, $S_{b(n)}$, $S_{a(n+1)}$ and $S_{b(n+1)}$. As a result, although the number of rows of pixels is larger (twice) than that in a conventional stripe-array structure (in which four color pixels are provided in each row, and pixels of one of the colors are provided in each column), the time required for supplying a signal voltage to each pixel (time period in which the TFT 14 is in an ON state; also referred to as the "write time") can be the same as in the conventional stripe-array structure. Accordingly, there is no obstacle against double speed or quadruple speed driving performed on the scanning and signal lines.

In addition, the polarity of the voltage applied to the first pixel $P_1$ and the polarity of the voltage applied to the third pixel $P_3$ are opposite to each other, and the polarity of the voltage applied to the second pixel $P_2$ and the polarity of the voltage applied to the fourth pixel $P_4$ are opposite to each other. Therefore, among two among the four pixels $P_1$ through $P_4$ included in each color display pixel $P_{CD}$, two pixels are supplied with a positive voltage, and the other two pixels are supplied with a negative voltage.

In the liquid crystal display device 100 in an embodiment according to the present invention, during an arbitrary vertical scanning period, the polarities of the signal voltages supplied to the first signal line 13a and the second signal line 13b are constant. Needless to say, in the liquid crystal display device 100, AC driving is performed and therefore the polarities of the signal voltages supplied to the first signal line 13a and the second signal line 13b are inverted at intervals of a vertical scanning period. Namely, the signal line driving circuit 30 merely inverts the polarity of the signal voltage supplied to each signal line 13 at intervals of a vertical scanning period, regardless of the number of rows of pixels (i.e., the cycle of polarity inversion is twice the vertical scanning period). Therefore, the load on the signal line driving circuit 30 of the liquid crystal display device 100 is smaller than the load on the signal line driving circuit in the liquid crystal display devices described in Patent Documents 1 and 2 or a conventionally common stripe array type liquid crystal display device. In this example, the polarity of the signal voltage supplied to each signal line 13 is inverted at intervals of a vertical scanning period. Alternatively, the polarity of the signal voltage supplied to each signal line 13 may be inverted at intervals of two or more vertical scanning periods. For example, when one, same image is written with the same polarity for two vertical scanning periods during driving at 240 Hz, there is an advantage that a sufficient time for charging the pixel can be obtained. As the cycle of polarity inversion is longer, the power consumption is smaller.

The above-described advantage of the liquid crystal display device 100 is conspicuous when double speed or quadruple speed driving is performed, namely, when the vertical scanning period is 1/120 sec. or less. Even when the conventional 60 Hz driving is performed, there is an advantage that the power consumption can be reduced. Therefore, as described in Patent Documents 1 and 2, it is preferable that the liquid crystal display device is structured so as to prevent flicker. Hereinafter, with reference to FIG. 2 through FIG. 5, a structure for preventing flicker will be described.

FIG. 2 through FIG. 5 show the connections between the TFTs 14 of the four pixels $P_1$ through $P_4$ and the two signal lines 13, and a polarity distribution of the signal voltages applied to the pixels, in liquid crystal display panels 10A through 10D usable as the liquid crystal display panel 10 of the liquid crystal display device 100.

The liquid crystal display panels 10A through 10D shown in FIG. 2 through FIG. 5 each have the structure of the liquid crystal display panel 10 described above with reference to FIG. 1. The polarity of the signal voltage supplied to each signal line 13 is not changed during the vertical scanning period and is inverted at intervals of a vertical scanning period. FIG. 2 through FIG. 5 show the polarities of the signal voltages applied to the pixels in a certain vertical scanning period. At the next vertical scanning period, the polarities of the signal voltages applied to the pixels are all inverted.

Figure 2:
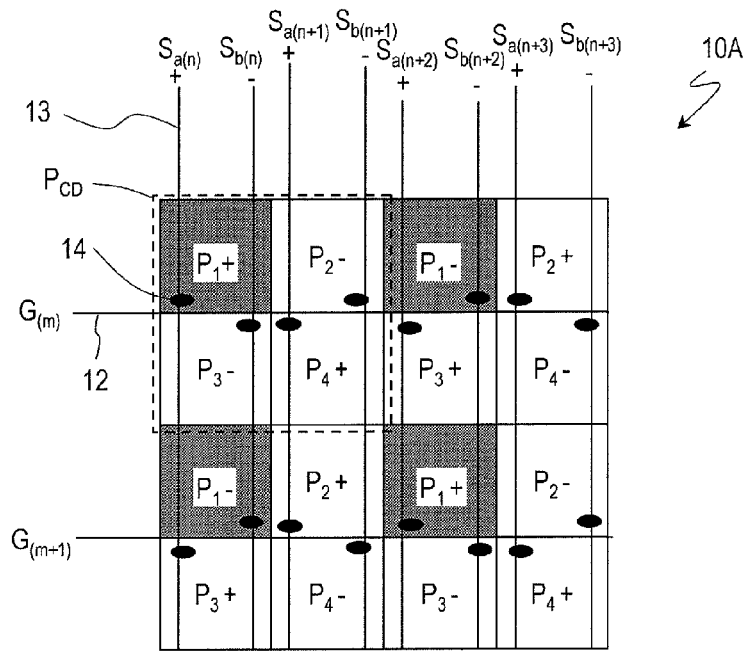
FIG. 2 shows connections between TFTs 14 of four pixels $P_1$ through $P_4$ and two signal lines 13, and a polarity distribution of signal voltages supplied to the pixels, in a liquid crystal display panel 10A.
Figure 3:
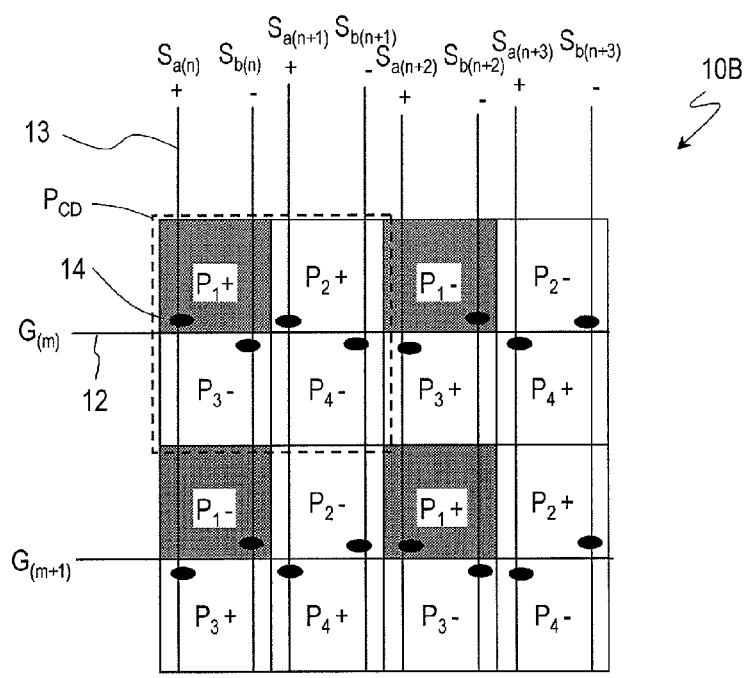
FIG. 3 shows connections between TFTs 14 of four pixels $P_1$ through $P_4$ and two signal lines 13, and a polarity distribution of signal voltages supplied to the pixels, in a liquid crystal display panel 10B.

In the liquid crystal display panels 10A and 10B shown in FIG. 2 and FIG. 3, among the four signal lines $S_{a(n)}$, $S_{b(n)}$, $S_{a(n+1)}$ and $S_{b(n+1)}$, the signal lines $S_{a(n)}$ and $S_{a(n+1)}$ are of the same polarity (in this example, positive), and the signal lines $S_{b(n)}$ and $S_{b(n+1)}$ are of the same polarity (in this example, negative). By contrast, in the liquid crystal display panels 10C and 10D shown in FIG. 4 and FIG. 5, among the four signal lines $S_{a(n)}$, $S_{b(n)}$, $S_{a(n+1)}$ and $S_{b(n+1)}$, the signal lines $S_{a(n)}$ and $S_{b(n+1)}$ are of the same polarity (in this example, positive), and the signal lines $S_{b(n)}$ and $S_{a(n+1)}$ are of the same polarity (in this example, negative).

As shown in FIG. 2 and FIG. 3, when the polarities of the signal voltages supplied to arbitrary two signal lines adjacent to each other are opposite to each other, the following advantages are obtained. For example, it is now assumed that there is a small foreign object on the signal lines and a small leak current is generated between the two signal lines (e.g., $S_{b(n)}$ and $S_{a(n+1)}$) via the foreign object. In this case, when the polarities of the voltages supplied to the signal lines close to each other are opposite to each other, a relatively high voltage is applied between these signal lines. As a result, a relatively large current flows in the foreign object. When this occurs, the foreign object is destroyed by the Joule heat, and as a result, the leak defect may be repaired. In addition, when the polarities of the signal voltages supplied to signal lines adjacent to each other are opposite to each other, the signal line driving circuit for dot inversion driving of a conventional liquid crystal display device having a stripe array of R, G and B pixels can be used as it is.

Regarding the liquid crystal display panel 10A shown in FIG. 2, in the color display pixel $P_{CD}$ including the first pixel $P_1$ of an m'th row and the n'th column, the TFT 14 of the first pixel $P_1$ is connected to the first signal line $S_{a(n)}$, and the TFT 14 of the third pixel $P_3$ is connected to the second signal line $S_{b(n)}$. The TFT 14 of the second pixel $P_2$ is connected to the second signal line $S_{b(n+1)}$, and the TFT 14 of the fourth pixel $P_4$ is connected to the first signal line $S_{a(n+1)}$. Accordingly, regarding the polarities of the signal voltages supplied to the four pixels $P_1$ through $P_4$, the polarities of the signal voltages supplied to the first pixel $P_1$ and the second pixel $P_2$ are opposite to each other, and the polarities of the signal voltages supplied to the third pixel $P_3$ and the fourth pixel $P_4$ are opposite to each other.

Next, the color display pixel $P_{CD}$ including the first pixel $P_1$ of the (m+1)th row and the n'th column will be described. In this color display pixel, the TFT 14 of the first pixel $P_1$ is connected to the second signal line $S_{b(n)}$, and the TFT 14 of the third pixel $P_3$ is connected to the first signal line $S_{a(n)}$. The TFT 14 of the second pixel $P_2$ is connected to the first signal line $S_{a(n+1)}$, and the TFT 14 of the fourth pixel $P_4$ is connected to the second signal line $S_{b(n+1)}$.

Namely, in one of two color display pixels adjacent to each other in the column direction, the connection relationship between the TFTs 14 of the four pixels $P_1$ through $P_4$ and the two signal lines 13 (e.g., signal lines $S_{a(n)}$ and $S_{b(n)}$, and signal lines $S_{a(n+1)}$ and $S_{b(n+1)}$) is opposite to that in the other of the two color display pixels. As a result, the polarities of the voltages applied to the pixels of a same color which are adjacent to each other in the column direction are opposite to each other. For example, the first pixel $P_1$ of the m'th row and the n'th column is supplied with a positive voltage, and the first pixel $P_1$ of the (m+1)th row and the n'th column is supplied with a negative voltage. Regarding the second through fourth pixels also, the polarities of the voltages applied to the pixels of a same color which are adjacent to each other in the column direction are opposite to each other.

Next, the color display pixel $P_{CD}$ including the first pixel $P_1$ of the m'th row and the (n+2)th column will be described. In this color display pixel, the TFT 14 of the first pixel $P_1$ is connected to the second signal line $S_{b(n+2)}$, and the TFT 14 of the third pixel $P_3$ is connected to the first signal line $S_{a(n+2)}$. The TFT 14 of the second pixel $P_2$ is connected to the first signal line $S_{a(n+3)}$, and the TFT 14 of the fourth pixel $P_4$ is connected to the second signal line $S_{b(n+3)}$.

Namely, in one of two color display pixels adjacent to each other in the row direction, the connection relationship between the TFTs 14 of the four pixels $P_1$ through $P_4$ and the two signal lines 13 (e.g., signal lines $S_{a(n)}$ and $S_{b(n)}$, and signal lines $S_{a(n+2)}$ and $S_{b(n+2)}$) is opposite to that in the other of the two color display pixels. As a result, the polarities of the voltages applied to the pixels of a same color which are adjacent to each other in the row direction are opposite to each other. For example, the first pixel $P_1$ of the m'th row and the n'th column is supplied with a positive voltage, and the first pixel $P_1$ of the m'th row and the (n+2)th column is supplied with a negative voltage. Regarding the second through fourth pixels also, the polarities of the voltages applied to the pixels of a same color which are adjacent to each other in the row direction are opposite to each other.

As can be seen from FIG. 2, the polarity of the voltage applied to the first pixel $P_1$ (hatched) in one color display pixel is opposite to that in a color display pixel adjacent to the one color display pixel in the column direction, and is opposite to that in a color display pixel adjacent to the one color display pixel in the row direction. The second through fourth pixels also have this relationship. Accordingly, the liquid crystal display panel 10A can prevent flicker as the liquid crystal display devices described in Patent Documents 1 and 2.

Now, FIG. 3 will be referred to. Regarding the liquid crystal display panel 10B shown in FIG. 3, in the color display pixel $P_{CD}$ including the first pixel $P_1$ of the m'th row and the n'th column, the TFT 14 of the first pixel $P_1$ is connected to the first signal line $S_{a(n)}$, and the TFT 14 of the third pixel $P_3$ is connected to the second signal line $S_{b(n)}$. The TFT 14 of the second pixel $P_2$ is connected to the first signal line $S_{a(n+1)}$, and the TFT 14 of the fourth pixel $P_4$ is connected to the second signal line $S_{b(n+1)}$. The connection relationship between the TFTs 14 and the two signal lines $S_{a(n+1)}$ and $S_{b(n+1)}$ regarding the second pixel $P_2$ and the fourth pixel $P_4$ is opposite to that of the liquid crystal display panel 10A shown in FIG. 2. Accordingly, regarding the polarities of the signal voltages supplied to the four pixels $P_1$ through $P_4$, the polarities of the signal voltages supplied to the first pixel $P_1$ and the second pixel $P_2$ are the same as each other, and the polarities of the signal voltages supplied to the third pixel $P_3$ and the fourth pixel $P_4$ are the same as each other.

Next, the color display pixel $P_{CD}$ including the first pixel $P_1$ of the (m+1)th row and the n'th column will be described. In this color display pixel, the TFT 14 of the first pixel $P_1$ is connected to the second signal line $S_{b(n)}$, and the TFT 14 of the third pixel $P_3$ is connected to the first signal line $S_{a(n)}$. The TFT 14 of the second pixel $P_2$ is connected to the second signal line $S_{b(n+1)}$, and the TFT 14 of the fourth pixel $P_4$ is connected to the first signal line $S_{a(n+1)}$.

Namely, in one of two color display pixels adjacent to each other in the column direction, the connection relationship between the TFTs 14 of the four pixels $P_1$ through $P_4$ and the two signal lines 13 (e.g., signal lines $S_{a(n)}$ and $S_{b(n)}$, and signal lines $S_{a(n+1)}$ and $S_{b(n+1)}$) is opposite to that in the other of the two color display pixels. As a result, the polarities of the voltages applied to the pixels of a same color which are adjacent to each other in the column direction are opposite to each other. For example, the first pixel $P_1$ of the m'th row and the n'th column is supplied with a positive voltage, and the first pixel $P_1$ of the (m+1)th row and the n'th column is supplied with a negative voltage. Regarding the second through fourth pixels also, the polarities of the voltages applied to the pixels of a same color which are adjacent to each other in the column direction are opposite to each other.

Next, the color display pixel $P_{CD}$ including the first pixel $P_1$ of the m'th row and the (n+2)th column will be described. In this color display pixel, the TFT 14 of the first pixel $P_1$ is connected to the second signal line $S_{b(n+2)}$, and the TFT 14 of the third pixel $P_3$ is connected to the first signal line $S_{a(n+2)}$. The TFT 14 of the second pixel $P_2$ is connected to the second signal line $S_{b(n+3)}$, and the TFT 14 of the fourth pixel $P_4$ is connected to the first signal line $S_{a(n+3)}$.

Namely, in one of two color display pixels adjacent to each other in the row direction, the connection relationship between the TFTs 14 of the four pixels $P_1$ through $P_4$ and the two signal lines 13 (e.g., signal lines $S_{a(n)}$ and $S_{b(n)}$, and signal lines $S_{a(n+2)}$ and $S_{b(n+2)}$) is opposite to that in the other of the two color display pixels. As a result, the polarities of the voltages applied to the pixels of a same color which are adjacent to each other in the row direction are opposite to each other. For example, the first pixel $P_1$ of the m'th row and the n'th column is supplied with a positive voltage, and the first pixel $P_1$ of the m'th row and the (n+2)th column is supplied with a negative voltage. Regarding the second through fourth pixels also, the polarities of the voltages applied to the pixels of a same color which are adjacent to each other in the row direction are opposite to each other.

As can be seen from FIG. 3, the polarity of the voltage applied to the first pixel $P_1$ (hatched) in one color display pixel is opposite to that in a color display pixel adjacent to the one color display pixel in the column direction, and is opposite to that in a color display pixel adjacent to the one color display pixel in the row direction. The second through fourth pixels also have this relationship. Accordingly, the liquid crystal display panel 10B can also prevent flicker as the liquid crystal display devices described in Patent Documents 1 and 2.

Figure 4:
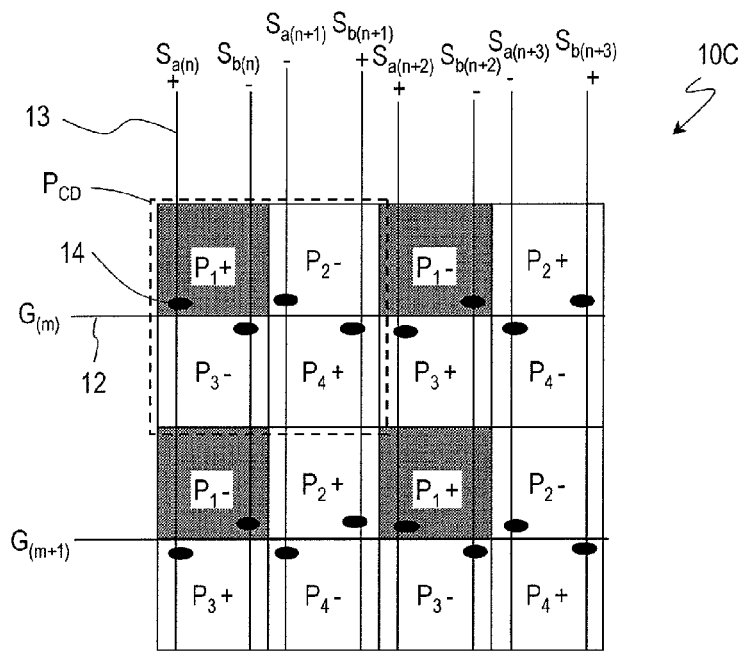
FIG. 4 shows connections between TFTs 14 of four pixels $P_1$ through $P_4$ and two signal lines 13, and a polarity distribution of signal voltages supplied to the pixels, in a liquid crystal display panel 10C.

Now, FIG. 4 will be referred to. Regarding the liquid crystal display panel 10C shown in FIG. 4, in the color display pixel $P_{CD}$ including the first pixel $P_1$ of the m'th row and the n'th column, the TFT 14 of the first pixel $P_1$ is connected to the first signal line $S_{a(n)}$, and the TFT 14 of the third pixel $P_3$ is connected to the second signal line $S_{b(n)}$. The TFT 14 of the second pixel $P_2$ is connected to the first signal line $S_{a(n+1)}$, and the TFT 14 of the fourth pixel $P_4$ is connected to the second signal line $S_{b(n+1)}$.

The connection relationship between the TFTs 14 of the four pixels $P_1$ through $P_4$ and the two signal lines 13 in the liquid crystal display panel 10C is the same as that of the liquid crystal display panel 10B shown in FIG. 3. The difference between the liquid crystal display panel 10C and the liquid crystal display panel 10B is in the polarities of the voltage signals supplied to the signal lines 13. Specifically, in the liquid crystal display panel 10B, among the four signal lines $S_{a(n)}$, $S_b$, $S_{a(n+1)}$ and $S_{b(n+1)}$ corresponding to one color display pixel, the signal lines $S_{a(n)}$ and $S_{a(n+1)}$ are of the same polarity (in this example, positive), and the signal lines $S_{b(n)}$ and $S_{b(n+1)}$ are of the same polarity (in this example, negative). By contrast, in the liquid crystal display panel 10C, among the four signal lines $S_{a(n)}$, $S_b$, $S_{a(n+1)}$ and $S_{b(n+1)}$, the signal lines $S_{a(n)}$ and $S_{b(n+1)}$ are of the same polarity (in this example, positive), and the signal lines $S_{b(n)}$ and $S_{a(n+1)}$ are of the same polarity (in this example, negative).

As is clear from a comparison between FIG. 4 and FIG. 3, if the polarities of the second pixel $P_2$ and the fourth pixel $P_4$ in FIG. 3 are inverted, the polarity distribution of FIG. 3 matches the polarity distribution of FIG. 4. In the liquid crystal display device 10C, regarding the polarities of the signal voltages supplied to the four pixels $P_1$ through $P_4$, the polarities of the signal voltages supplied to the first pixel $P_1$ and the second pixel $P_2$ are opposite to each other, and the polarities of the signal voltages supplied to the third pixel $P_3$ and the fourth pixel $P_4$ are opposite to each other.

As can be seen from FIG. 4, the polarity of the voltage applied to the first pixel $P_1$ (hatched) in one color display pixel is opposite to that in a color display pixel adjacent to the one color display pixel in the column direction, and is opposite to that in a color display pixel adjacent to the one color display pixel in the row direction. The second through fourth pixels also have this relationship. Accordingly, the liquid crystal display panel 10C can also prevent flicker as the liquid crystal display devices described in Patent Documents 1 and 2.

Figure 5:
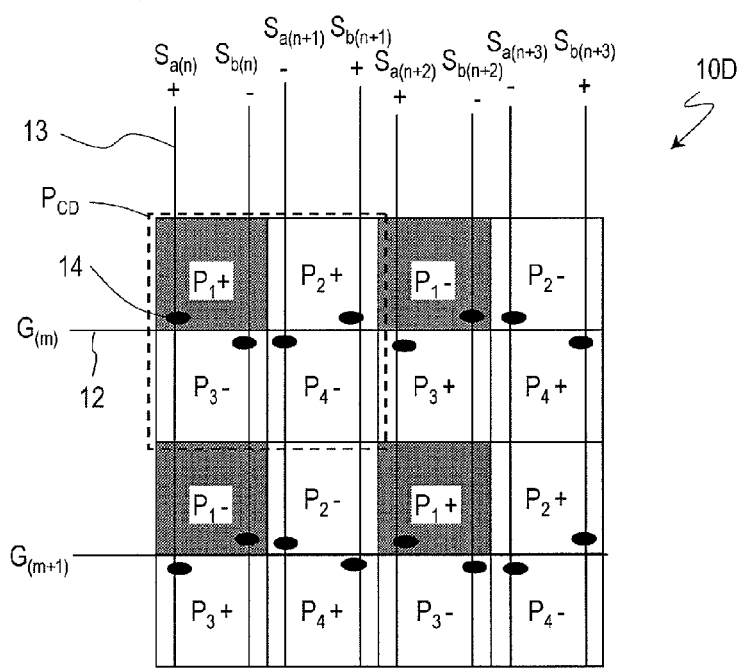
FIG. 5 shows connections between TFTs 14 of four pixels $P_1$ through $P_4$ and two signal lines 13, and a polarity distribution of signal voltages supplied to the pixels, in a liquid crystal display panel 10D.

Now, FIG. 5 will be referred to. Regarding the liquid crystal display panel 10D shown in FIG. 5, in the color display pixel $P_{CD}$ including the first pixel $P_1$ of the m'th row and the n'th column, the TFT 14 of the first pixel $P_1$ is connected to the first signal line $S_{a(n)}$, and the TFT 14 of the third pixel $P_3$ is connected to the second signal line $S_{b(n)}$. The TFT 14 of the second pixel $P_2$ is connected to the second signal line $S_{b(n+1)}$, and the TFT 14 of the fourth pixel $P_4$ is connected to the first signal line $S_{a(n+1)}$.

The connection relationship between the TFTs 14 of the four pixels $P_1$ through $P_4$ and the two signal lines 13 in the liquid crystal display panel 10D is the same as that of the liquid crystal display panel 10A shown in FIG. 2. The difference between the liquid crystal display panel 10D and the liquid crystal display panel 10A is in the polarities of the voltage signals supplied to the signal lines 13. Specifically, in the liquid crystal display panel 10A, among the four signal lines $S_{a(n)}$, $S_b$, $S_{a(n+1)}$ and $S_{b(n+1)}$) corresponding to one color display pixel, the signal lines $S_{a(n)}$ and $S_{a(n+1)}$ are of the same polarity (in this example, positive), and the signal lines $S_{b(n)}$ and $S_{b(n+1)}$ are of the same polarity (in this example, negative). By contrast, in the liquid crystal display panel 10D, among the four signal lines $S_{a(n)}$, $S_b$, $S_{a(n+1)}$ and $S_{b(n+1)}$, the signal lines $S_{a(n)}$ and $S_{b(n+1)}$ are of the same polarity (in this example, positive), and the signal lines $S_{b(n)}$ and $S_{a(n+1)}$ are of the same polarity (in this example, negative).

As is clear from a comparison between FIG. 5 and FIG. 2, if the polarities of the second pixel $P_2$ and the fourth pixel $P_4$ in FIG. 5 are inverted, the polarity distribution of FIG. 5 matches the polarity distribution of FIG. 2. In the liquid crystal display device 10D, regarding the polarities of the signal voltages supplied to the four pixels $P_1$ through $P_4$, the polarities of the signal voltages supplied to the first pixel $P_1$ and the second pixel $P_2$ are the same as each other, and the polarities of the signal voltages supplied to the third pixel $P_3$ and the fourth pixel $P_4$ are the same as each other.

As can be seen from FIG. 5, the polarity of the voltage applied to the first pixel $P_1$ (hatched) in one color display pixel is opposite to that in a color display pixel adjacent to the one color display pixel in the column direction, and is opposite to that in a color display pixel adjacent to the one color display pixel in the row direction. The second through fourth pixels also have this relationship. Accordingly, the liquid crystal display panel 10D can also prevent flicker as the liquid crystal display devices described in Patent Documents 1 and 2.

Now, with reference to FIG. 6 and FIG. 7, a structure and operation of a liquid crystal display panel 10E having a multi-pixel structure will be described. The "multi-pixel structure" is a structure in which for displaying a certain intermediate gray scale level, each pixel includes a bright sub pixel exhibiting a luminance higher than that of the gray scale level to be displayed and a dark sub pixel exhibiting a luminance lower than that of the gray scale level to be displayed. By introducing the multi-pixel structure, the viewing angle dependence of the γ characteristic can be alleviated. As the multi-pixel structure, a structure described in Japanese Laid-Open Patent Publication No. 2006-133577, for example, can be adopted. The disclosure of Japanese Laid-Open Patent Publication No. 2006-133577 is entirely incorporated herein by reference.

Figure 6:
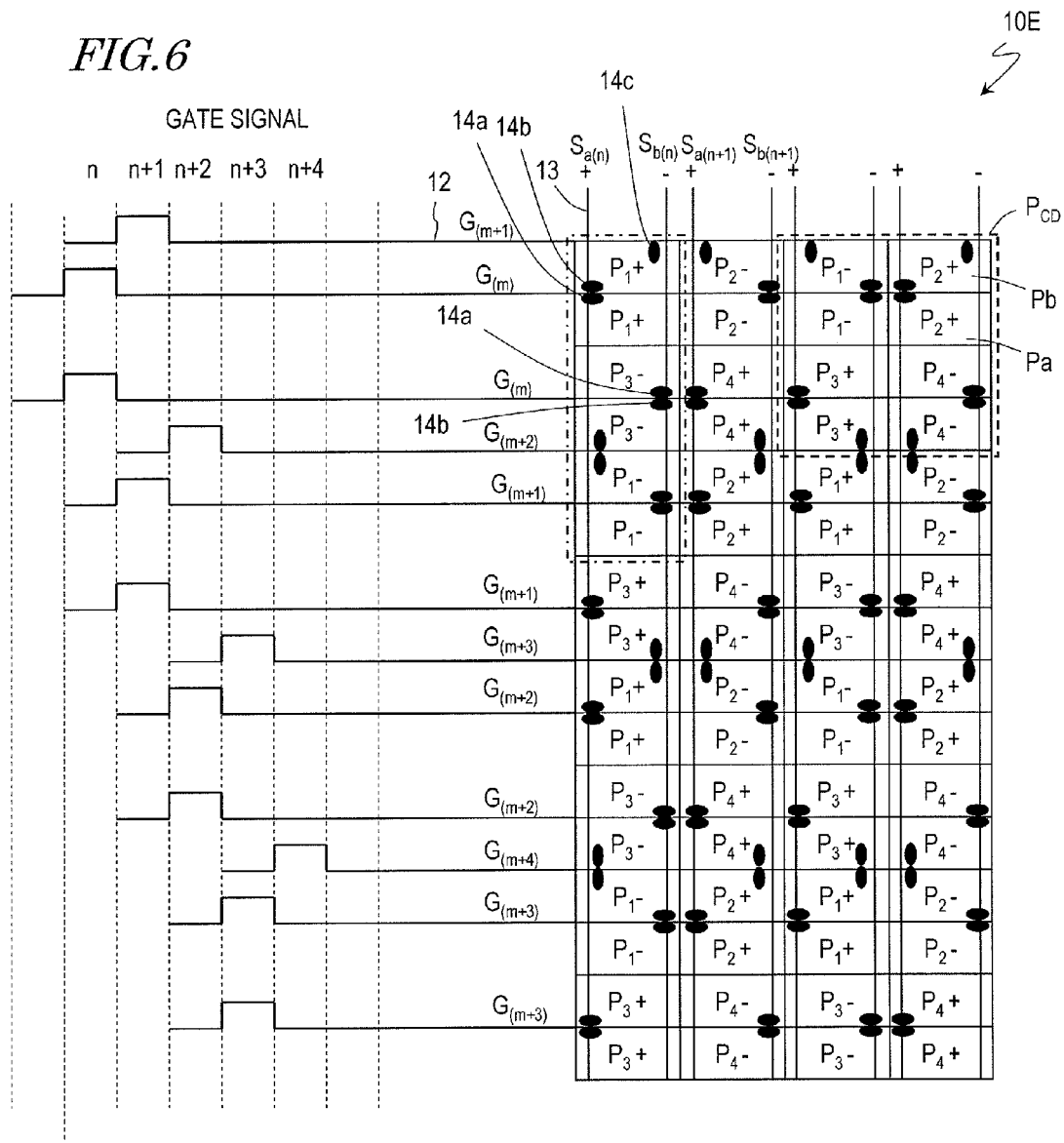
FIG. 6 shows connections between TFTs of pixels and signal lines, and gate signals, in a liquid crystal display panel 10E having a multi-pixel structure.

FIG. 6 shows the connection relationship between the TFTs of the pixels and the signal lines, and also shows the timing at which a gate signal as a scanning signal is turned ON. FIG. 7 shows an equivalent circuit of three pixels enclosed by the one-dot chain line in FIG. 6.

The liquid crystal display panel 10E shown in FIG. 6 is obtained as a result of applying the multi-pixel structure to the liquid crystal display panel 10A shown in FIG. 2. The four pixels $P_1$ through $P_4$ each include a sub pixel Pa and a sub pixel Pb. In this example, the sub pixel Pa is a bright sub pixel, and the sub pixel Pb is a dark sub pixel. The bright sub pixel Pa and the dark sub pixel Pb are obtained as a result of dividing each pixel into two in the column direction. Here, for the sake of simplicity, the bright sub pixel Pa and the dark sub pixel Pb are shown as having an approximately equal area size. Nonetheless, the area size ratio of the bright sub pixel Pa and the dark sub pixel Pb is not limited to this, and may be changed when necessary. As shown here as an example, it is preferable that the bright pixels Pa in the four pixels $P_1$ through $P_4$ included in the color display pixel $P_{CD}$ are located at a center of the color display pixel $P_{CD}$ in the column direction. Namely, it is preferable that the lower sub pixels in the first pixel $P_1$ and the second pixel $P_2$ and the upper sub pixels in the third pixel $P_3$ and the fourth pixel $P_4$ are the bright sub pixels Pa.

If there is a dark sub pixel between the bright sub pixels in the first and second pixels and the bright sub pixels in the third and fourth pixels, colors may blur. For example, when a white square or rectangle having edges parallel to the rows of pixels is displayed, at the upper edge of the rectangle, the bright sub pixels in the first and second pixels of the row of pixels corresponding to the edge are conspicuous. Namely, the bright sub pixels in the pixels of two colors are conspicuous. As a result, the color of the upper edge of the white rectangle appears to blur. In the case where, as described above, the bright sub pixels Pa of the four pixels $P_1$ through $P_4$ included in the color display pixel $P_{CD}$ are located at a center of the color display pixel $P_{CD}$ in the column direction, the bright sub pixels Pa of the four pixels are close to each other. Therefore, color blur can be prevented.

As shown in FIG. 6, the four pixels $P_1$ through $P_4$ each include the bright sub pixel Pa and the dark sub pixel Pb. The bright sub pixel Pa is connected to a TFT 14a, and the dark sub pixel Pb is connected to a TFT 14b. Gates of the TFTs 14a and 14b are connected to a common scanning line 12, and sources of the TFTs 14a and 14b are connected to a common signal line 13. Namely, the sub pixels Pa and Pb each include a sub pixel electrode corresponding to the pixel electrode 11 shown in FIG. 1(b). The sub pixel electrodes of the sub pixels Pa and Pb are connected to drains of the corresponding TFTs 14a and 14b and are connected to the common signal line (source sub line) 13 via the TFTs 14a and 14b.

In the liquid crystal display panel 10A shown in FIG. 2, the TFTs 14 of the first pixel $P_1$, the second pixel $P_2$, the third pixel $P_3$ and the fourth pixel $P_4$, namely, four TFTs 14 in total are connected to the common scanning line (gate sub line) 12. By contrast, in the liquid crystal display panel 10E, the TFTs of the bright sub pixel and the dark sub pixel of the first pixel $P_1$ and the bright sub pixel and the dark sub pixel of the second pixel $P_2$, namely, four TFTs 14a and 14b in total are connected to a common scanning line (gate sub line) 12 (e.g., the upper scanning line $G_{(m)}$ in FIG. 6). Similarly, the TFTs of the bright sub pixel and the dark sub pixel of the third pixel $P_3$ and the bright sub pixel and the dark sub pixel of the fourth pixel $P_4$, namely, four TFTs 14a and 14b in total are connected to another common scanning line 12 (e.g., the lower scanning line $G_{(m)}$ in FIG. 6). As shown in FIG. 6, these two scanning lines 12 are supplied with a common gate signal. Referring to FIG. 6, during the period in which the gate signal is HIGH, the TFTs 14a and 14b are in an ON state, and signal voltages are supplied from the corresponding signal lines 13. Accordingly, the sub pixels of the four pixels $P_1$ through $P_4$ (eight sub pixels in total) in the liquid crystal display panel 10E are each supplied with a corresponding signal voltage when the corresponding TFTs 14a and 14b are turned ON (like the four pixels $P_1$ through $P_4$ in the liquid crystal display panel 10A). The gates of the TFTs 14a and 14b are controlled to be ON/OFF by a common gate signal.

The four pixels $P_1$ through $P_4$ in the liquid crystal display panel 10E each further include a third TFT 14c. As shown in FIG. 7, the third TFT 14c switches the electrical connection between a capacitance CSb of the dark sub pixel Pb and a buffer capacitance CSc connected parallel thereto. A gate of the TFT 14c is connected to the next-stage scanning line (e.g., $G_{(m+1)}$), and is put into an ON state at the same timing as the TFTs 14a and 14b of the next-stage color display pixel, namely, the color display pixel which is adjacent to the color display pixel of interest in the column direction. By putting the third TFT 14c into an ON state, the sub pixel Pb becomes a dark sub pixel.

Figure 7:
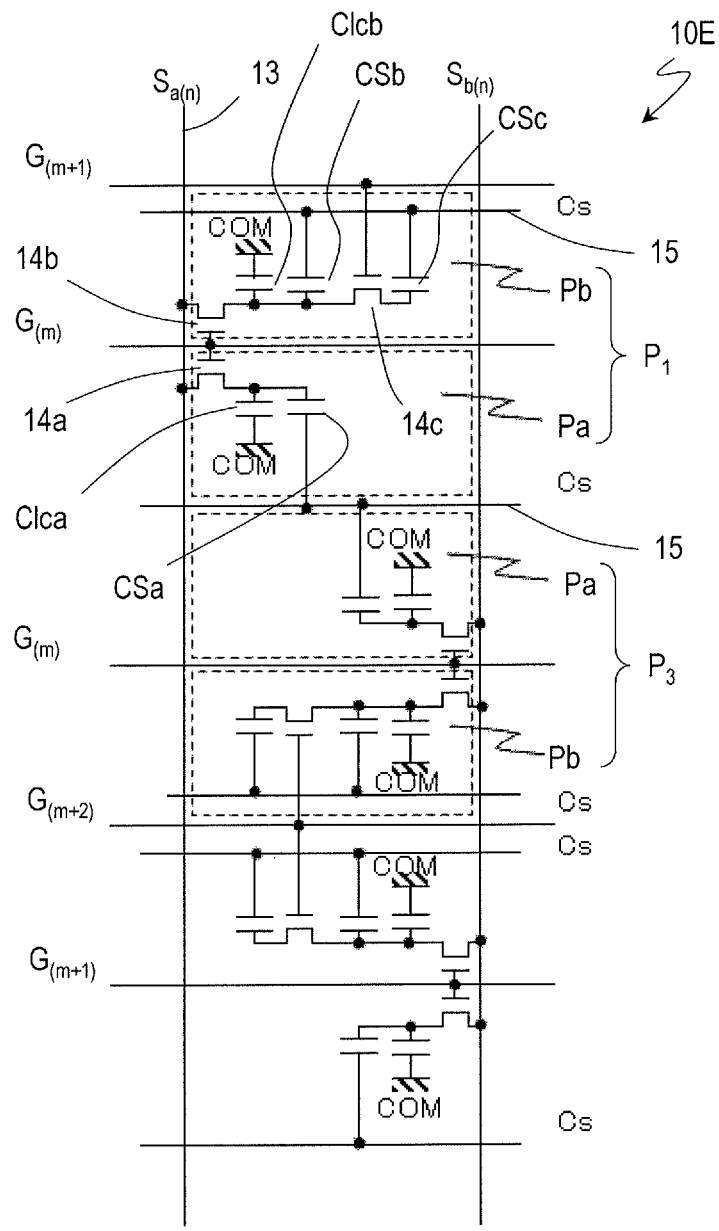
FIG. 7 shows an equivalent circuit of three pixels (three pixels enclosed by the one-dot chain line in FIG. 6) in the liquid crystal display panel 10E.

With reference to FIG. 7, an operation of forming the bright sub pixel Pa and the dark sub pixel Pb in the first pixel $P_1$ of the m'th row and the n'th column of the liquid crystal display panel 10E will be described.

When a gate signal of the scanning line $G_{(m)}$ becomes HIGH, the TFTs 14a and 14b are put into an ON state, and a prescribed signal (herein, $V_{(k)}$) is supplied from the signal line $S_{a(n)}$ to the sub pixels Pa and Pb. Thus, a liquid crystal capacitance Clca and a storage capacitance CSa of the sub pixel Pa (these capacitances are also referred to as the "sub pixel capacitance $C_{Pa}$") and a liquid crystal capacitance Clcb and a storage capacitance CSb of the sub pixel Pb (these capacitances are also referred to as the "sub pixel capacitance $C_{Pb}$") are charged. One of the pixel electrodes forming each of the liquid crystal capacitances Clca and Clcb is the sub pixel electrode of the corresponding sub pixel, and the other electrode is the counter electrode. The counter electrode is supplied with a common voltage (counter voltage) COM. One of the electrodes forming each of the storage capacitances CSa and CSb is a storage capacitance electrode and is connected to a drain electrode of the TFT 14a or 14b. Thus, the storage capacitance electrode is supplied with the same voltage as that of the sub pixel electrode of the corresponding sub pixel. The other electrode forming each of the storage capacitances CSa and CSb is connected to a storage capacitance line (Cs) 15 and is supplied with a storage capacitance voltage.

At this point, a gate signal of the scanning line $G_{(m+1)}$ is LOW, and thus the TFT 14c is in an OFF state. In the buffer capacitance CSc, the signal voltage written in the immediately previous vertical scanning period (herein, $V_{(k-1)}$) is retained. The liquid crystal display panel 10E is driven by frame inversion driving. Therefore, the polarity of the voltage which is written in the current vertical scanning period is opposite to the polarity of the voltage written in the immediately previous vertical scanning period.

Next, when the gate signal of the scanning line $G_{(m)}$ becomes LOW and the TFTs 14a and 14b are put into an OFF state, the sub pixel capacitances $C_p$, and $C_{Pb}$ are put into the state of retaining $V_{(k)}$.

Next, when the gate signal of the scanning line $G_{(m+1)}$ becomes HIGH, the TFT 14c is put into an ON state. When TFT 14c is put into the ON state, the sub pixel capacitance $C_{Pb}$ and the buffer capacitance CSc are connected parallel to each other. Accordingly, the charges stored in the sub pixel capacitance $C_{Pb}$ and the charges stored in the buffer capacitance CSc are re-distributed such that voltage $V_{(k)}$ retained by the sub pixel capacitance $C_{Pb}$ and voltage $V_{(k-1)}$ retained by the buffer capacitance CSc are equal to each other. At this point, $V_{(k-1)}$ has a polarity opposite to the polarity of the $V_{(k)}$. Therefore, the overall charge amount stored in the sub pixel capacitance $C_{Pb}$ and the buffer capacitance CSc is reduced, and the voltage of the sub pixel capacitance $C_{Pb}$ becomes lower than voltage $V_{(k)}$ (the absolute value of the voltage of the sub pixel capacitance $C_{Pb}$ becomes smaller than that of $V_{(k)}$). As a result, the luminance of the sub pixel Pb becomes lower than the luminance of the sub pixel Pa in which voltage $V_{(k)}$ is retained.

Even in the case where the polarity of the signal voltage supplied to each signal line is inverted at intervals of two vertical scanning periods, the above-described operation is usable to make the sub pixel Pb a dark sub pixel. For example, after a negative signal voltage is applied, the polarity is inverted to write a positive signal voltage. As a result, as described above, the luminance of the sub pixel Pb becomes lower than the luminance of the sub pixel Pa. Even when the same positive voltage is supplied after this, the luminance of the sub pixel Pb is not changed. However, in consideration of the average luminance during the two vertical scanning periods in which the positive signal voltage is supplied, the average luminance of the sub pixel Pb is lower than the luminance of the sub pixel Pa. Accordingly, even when the polarity of the signal voltage supplied to each signal line is inverted at intervals of two vertical scanning periods, the effect of the multi-pixel structure can be provided.

The multi-pixel structure described in Japanese Laid-Open Patent Publication No. 2006-133577 is preferably usable for a vertical alignment type liquid crystal display device in which a plurality of liquid crystal domains are formed in one pixel and which provides display in a normally black mode. (Typically, the plurality of liquid crystal domains include four liquid crystal domains, the directors of which have azimuth angles of 45°, 135°, 225° and 315° (where the rightward direction, i.e., the 3 o'clock direction of a clock face is 0°, and the counterclockwise direction is the positive direction) at least when a voltage is applied to the liquid crystal layer.)

Another multi-pixel structure usable for a liquid crystal display device according to the present invention is disclosed in Japanese Laid-Open Patent Publication No. 2004-62146 (U.S. Pat. No. 6,958,791) filed by the present applicant. According to this multi-pixel structure, a storage capacitance is provided for each of a plurality of sub pixels included in one pixel, and a storage capacitance counter electrode forming the storage capacitance (connected to the CS bus line) is made electrically independent for each sub pixel. The voltages supplied to the storage capacitance counter electrodes (referred to as the "storage capacitance counter capacitances") are made different. By use of capacitance division, the effective voltages applied to a plurality of areas of the liquid crystal layer corresponding to the plurality of sub pixels are made different. The disclosure of Japanese Laid-Open Patent Publication No. 2004-62146 (U.S. Pat. No. 6,958,791) is entirely incorporated herein by reference.

As a vertical alignment type liquid crystal display device, Japanese Laid-Open Patent Publication No. 2006-133577 describes a liquid crystal display device of the so-called MVA mode. In an MVA mode liquid crystal display device, linear slits formed in electrodes and linear dielectric projections (ribs) formed on the electrodes on the liquid crystal layer side are located, on the pair of substrates facing each other while having a liquid crystal layer therebetween, to be parallel to, and alternate to, each other when seen in a direction normal to the substrates. Owing to this, the azimuth directions of the directors of the liquid crystal domains formed at the time of voltage application are regulated. The azimuth direction of each liquid crystal domain is perpendicular to the azimuth direction in which the linear slits or dielectric projections (collectively referred to as the "linear structures") extend.

Today, such MVA mode liquid crystal display devices are widely used for liquid crystal TVs. However, in an MVA mode liquid crystal display device, the alignment regulating force from the linear structures regulates the azimuth direction of the directors of the liquid crystal domains. Therefore, there is a problem that the responsiveness of the liquid crystal molecules is high (the alignment direction changes fast) in the vicinity of the linear structures and low at a position far from the linear structures.

As a vertical alignment type liquid crystal display device having a response characteristic higher than that of the MVA mode liquid crystal display device, a PSA mode liquid crystal display device is known. The polymer sustained alignment technology (hereinafter, referred to as the "PSA technology") is disclosed in, for example, Japanese Laid-Open Patent Publications Nos. 2002-357830, 2003-177418 and 2006-78968, and K. Hanaoka et al., "A New MVA-LCD by Polymer Sustained Alignment Technology", SID 04

DIGEST, pp. 1200-1203 (2004). The disclosures of these four documents are entirely incorporated herein by reference.

According to the PSA technology, the pretilt direction of the liquid crystal molecules is controlled as follows. A small amount of polymerizable compound (e.g., a photopolymerizable monomer or oligomer) is mixed in a liquid crystal material. After a liquid crystal cell is assembled, the polymerizable compound is irradiated with active energy rays (e.g., ultraviolet rays) in the state where a prescribed voltage is applied to the liquid crystal layer. The pretilt direction of the liquid crystal molecules is controlled by the polymer which is thus generated. The alignment state of the liquid crystal molecules realized when the polymer is generated is maintained (stored) even after the voltage is removed (in the absence of the voltage). Herein, the layer formed of the polymer will be referred to as an "alignment sustaining layer". The alignment sustaining layer is formed on surfaces of alignment films (on the liquid crystal layer side). The alignment sustaining layer does not need to be in the form of a film covering the surfaces of the alignment films, and may be in the form of particles of the polymer discretely provided.

The PSA technology has an advantage of adjusting the pretilt azimuth angle and the pretilt angle of the liquid crystal molecules by controlling the electric field or the like formed in the liquid crystal layer. In addition, since an alignment sustaining layer expresses an alignment regulating force on substantially the entire plane thereof contacting the liquid crystal layer, a higher response characteristic than that of the MVA mode liquid crystal display device is provided. When, specifically, double speed driving or the like is performed, the present invention is preferably applicable to a PSA mode liquid crystal display device.

Figure 8:
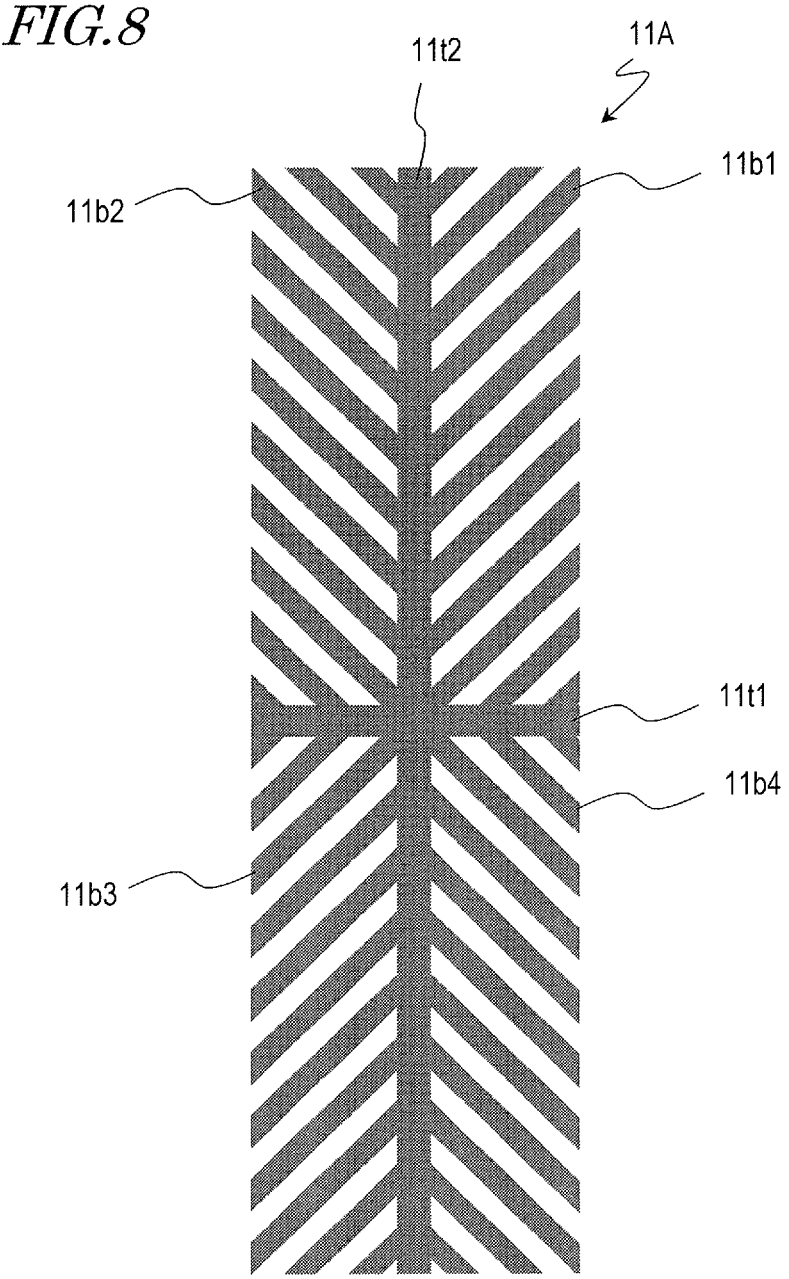
FIG. 8 is a schematic plan view of a pixel electrode 11A usable for a PSA mode liquid crystal display device in an embodiment according to the present invention.

A PSA mode liquid crystal display device in an embodiment according to the present invention is obtained by, for example, using a pixel electrode 11A shown in FIG. 8 as the pixel electrode 11 of the liquid crystal display panel 10 and applying the above-described PSA technology.

The pixel electrode 11A includes cross-shaped trunk portions 11t1 and 11t2 located to overlap polarizing axes of a pair of polarizing plates and a plurality of branch portions 11b1, 11b2, 11b3 and 11b4 extending in a direction of about 45° with respect to the cross-shaped trunk portions 11t1 and 11t2.

The trunk portions include the trunk portion 11t1 extending in the row direction (horizontal direction) and the trunk portion 11t2 extending in the column direction (vertical direction). Where the azimuth angle of the rightward direction of the display plane (the 3 o'clock direction of a clock face) is 0°, the plurality of branch portions include a first group (branch portions 11b1) extending at an azimuth angle of 45° from the trunk portion, a second group (branch portions 11b2) extending at an azimuth angle of 135° from the trunk portion, a third group (branch portions 11b3) extending at an azimuth angle of 225° from the trunk portion, and a fourth group (branch portions 11b4) extending at an azimuth angle of 315° from the trunk portion. The liquid crystal molecules in the liquid crystal layer of the vertical alignment type (having negative dielectric anisotropy) are tilted in azimuth directions in which the corresponding branch portions extend because of oblique electric fields from the trunk portions and the branch portions. A reason for this is that an oblique electric field from the branch portions extending parallel to each other acts to tilt the liquid crystal molecules in an azimuth direction perpendicular to the direction in which the branch portions extend, and an oblique electric field from the trunk portions act to tilt the liquid crystal molecules in directions in which the corresponding branch portions extend. By use of the PSA technology, the above-described alignment of the liquid crystal molecules which is formed when a voltage is applied to the liquid crystal layer can be stabilized.

Needless to say, the present invention is widely applicable to liquid crystal display devices of, for example, an RTN (also referred to as "VAIN") mode, an IPS mode and an FSS mode in addition to the liquid crystal display devices in the above embodiments.

In the above description, the row direction is set as the horizontal direction of the display plane and the column direction is set as the vertical direction of the display plane. These directions may be opposite. Namely, the gate bus lines may be located to extend in the vertical direction and the source bus lines may be located to extend in the horizontal direction. In other words, the row direction and the column direction in the above description may be exchanged.

INDUSTRIAL APPLICABILITY

The present invention is widely applicable to liquid crystal display devices for HDTV and other applications.

REFERENCE SIGNS LIST 10, 10A, 10B, 10C, 10D, 10E Liquid crystal display panel
10a Active matrix substrate
11 Pixel electrode
12 Scanning line
13 Signal line
13a First signal line
13b Second signal line
14 Thin film transistor (TFT)
15 Storage capacitance line
20 Scanning line driving circuit (gate driver)
30 Signal line driving circuit (source driver)
100 Liquid crystal display device
P, $P_1$, $P_2$, $P_3$, $P_4$ Pixel
$P_{CD}$ Color display pixel

The invention claimed is:

1. A liquid crystal display device including a plurality of pixels arrayed in a matrix of a plurality of rows by a plurality of columns, the liquid crystal display device comprising:
   an active matrix substrate including a pixel electrode provided for each of the plurality of pixels, a switching element connected to the pixel electrode, a plurality of scanning lines extending in a row direction, and a plurality of signal lines extending in a column direction;
   a counter substrate facing the active matrix substrate;
   a liquid crystal layer provided between the active matrix substrate and the counter substrate;
   a scanning line driving circuit for supplying a scanning signal to each of the plurality of scanning lines; and
   a signal line driving circuit for supplying a positive or negative signal voltage to each of the plurality of signal lines; wherein:
   the plurality of pixels form a plurality of color display pixels, and the plurality of color display pixels each include a first pixel, a second pixel, a third pixel, and a fourth pixel arrayed in two rows by two columns; wherein the first pixel and the second pixel are adjacent to each other in the row direction, the third pixel and the fourth pixel are adjacent to each other in the row direction, the first pixel and the third pixel are adjacent to each other in the column direction, and the second pixel and the fourth pixel are adjacent to each other in the column direction, in each of the plurality of color display pixels;

the plurality of signal lines include first and second signal lines which are located in correspondence with each column of pixels and are supplied with signal voltages of opposite polarities from each other from the signal line driving circuit in each vertical scanning period;

in any given color display pixel, the switching element of one of the first and third pixels is connected to the first signal line, the switching element of the other of the first and third pixels is connected to the second signal line, the switching element of one of the second and fourth pixels is connected to the first signal line, the switching element of the other of the second and fourth pixels is connected to the second signal line, and the switching elements of the first, second, third and fourth pixels are controlled to be ON/OFF by a common scanning signal;

during any given vertical scanning period, the polarities of the signal voltages supplied to the first and second signal lines are constant;

in said any given vertical scanning period, a polarity of the signal voltage supplied to each of the first pixel, the second pixel, the third pixel, and the fourth pixel included in said any given color display pixel, and a polarity of the signal voltage supplied to each of the first pixel, the second pixel, the third pixel, and the fourth pixel included in a color display pixel adjacent to said any given color display pixel in the row direction, are opposite to each other; and the first pixel included in said any given color display pixel and the second pixel included in the color display pixel adjacent to said any given color display pixel are directly adjacent to one another, and the third pixel included in said any given color display pixel and the fourth pixel included in the color display pixel adjacent to said any given color display pixel are directly adjacent to one another.

2. The liquid crystal display device of claim 1, wherein in a color display pixel adjacent to said any given color display pixel in the column direction, the switching element of one of the first and third pixels is connected to the second signal line, the switching element of the other of the first and third pixels is connected to the first signal line, the switching element of one of the second and fourth pixels is connected to the second signal line, and the switching element of the other of the second and fourth pixels is connected to the first signal line.

3. The liquid crystal display device of claim 1, wherein in said any given vertical scanning period, the polarities of the voltage signals supplied to the first pixel and the second pixel included in any given first color display pixel are opposite to each other, and the polarities of the voltage signals supplied to the third pixel and the fourth pixel included in the said any given first color display pixel are opposite to each other.

4. The liquid crystal display device of claim 1, wherein in said any given vertical scanning period, the polarities of the signal voltages supplied to any two given signal lines adjacent to each other, among the plurality of signals, are opposite to each other.

5. The liquid crystal display device of claim 1, wherein in said any given color display pixel, the switching elements of the first, second, third and fourth pixels are connected to a common scanning line.

6. The liquid crystal display device of claim 1, wherein the first, second, third and fourth pixels include one of a yellow pixel, a cyan pixel, a magenta pixel and a white pixel in addition to a red pixel, a blue pixel and a green pixel.

7. The liquid crystal display device of claim 1, wherein for displaying an intermediate gray scale level, the plurality of pixels each include a bright sub pixel exhibiting a luminance higher than that of the gray scale level to be displayed and a dark sub pixel exhibiting a luminance lower than that of the gray scale level to be displayed.

8. The liquid crystal display device of claim 1, wherein the any given vertical scanning period is $1/120$ seconds or shorter.

* * * * *